United States Patent [19]

Yee et al.

[11] Patent Number: 4,886,289

[45] Date of Patent: * Dec. 12, 1989

[54] TANDEM BABY CARRIAGE WITH FACING SEATS

[75] Inventors: David T. Yee, Hacienda Heights; Eric Lin, Alhambra; Fang-Tung Yee, Hawthorne, all of Calif.

[73] Assignee: A B Oriental Trading Company, Inc., Los Angeles, Calif.

[*] Notice: The portion of the term of this patent subsequent to Aug. 22, 2006 has been disclaimed.

[21] Appl. No.: 175,866

[22] Filed: Mar. 31, 1988

Related U.S. Application Data

[63] Continuation-in-part of Ser. No. 113,260, Oct. 26, 1987.

[51] Int. Cl.$^4$ .............................................. B62B 7/08
[52] U.S. Cl. ..................... 280/643; 280/644; 280/658; 280/47.35; 280/47.4; 297/245
[58] Field of Search ............... 280/642, 643, 644, 648, 280/649, 650, 658, 47.38, 47.4; 297/245, DIG. 4; 296/784

[56] References Cited

U.S. PATENT DOCUMENTS

| | | | |
|---|---|---|---|
| D. 145,468 | 8/1946 | Spence | 280/47.38 X |
| 1,842,159 | 1/1932 | Fleishman et al. | 280/47.35 |
| 3,223,431 | 12/1965 | Gottfried et al. | 297/245 |
| 3,248,125 | 4/1966 | Gill | 280/643 X |
| 3,309,101 | 3/1967 | Romay | 280/47.38 |
| 3,330,575 | 7/1967 | Boudreau | 280/649 X |
| 4,506,907 | 3/1985 | Miyagi | 280/642 |
| 4,529,219 | 7/1985 | Shamie | 280/642 |
| 4,542,915 | 9/1985 | Wheeler, III et al. | 280/642 |
| 4,597,116 | 7/1986 | Kassai | 5/99 A |
| 4,660,850 | 4/1987 | Nakao et al. | 280/642 |

FOREIGN PATENT DOCUMENTS

| | | | |
|---|---|---|---|
| 216543 | 11/1909 | Fed. Rep. of Germany | 280/47.38 |
| 624618 | 7/1927 | France | 280/47.38 |
| 2257 | of 1884 | United Kingdom | 280/47.38 |
| 13671 | of 1910 | United Kingdom | 280/642 |

*Primary Examiner*—Charles A. Marmor
*Assistant Examiner*—Brian L. Johnson
*Attorney, Agent, or Firm*—Sheldon & Mak

[57] ABSTRACT

A foldable two seat face-to-face tandem baby carriage includes a pair of wheeled front legs, a pair of wheeled rear legs, and, two pairs of horizontal longitudinal bars extending between the legs. A U-shaped push handle connects pivotally with the rear of the upper bars, and the free ends of the push handle substantially abut the rear legs about midway along the length. Locking means interengage the push handle with the legs in the extended position and bars in the horizontal position to provide a tandem seating construction with seats and backrests facing each other. Folding is effected when the backrests are parallel and an additional locking slot is provided in a support for anchoring the forward backrest in the parallel position. Release of the lock by foot pressure on a transverse bar extending between the rear legs causes the push handle to move downwardly and forwardly and the two legs to collapse and fold towards each other to be substantially parallel with the push handle in the folded position. The two sets of parallel longitudinal bars collapse to be substantially parallel and towards each other in the folded position. A single action permits folding and unfolding of the tandem carriage.

18 Claims, 2 Drawing Sheets

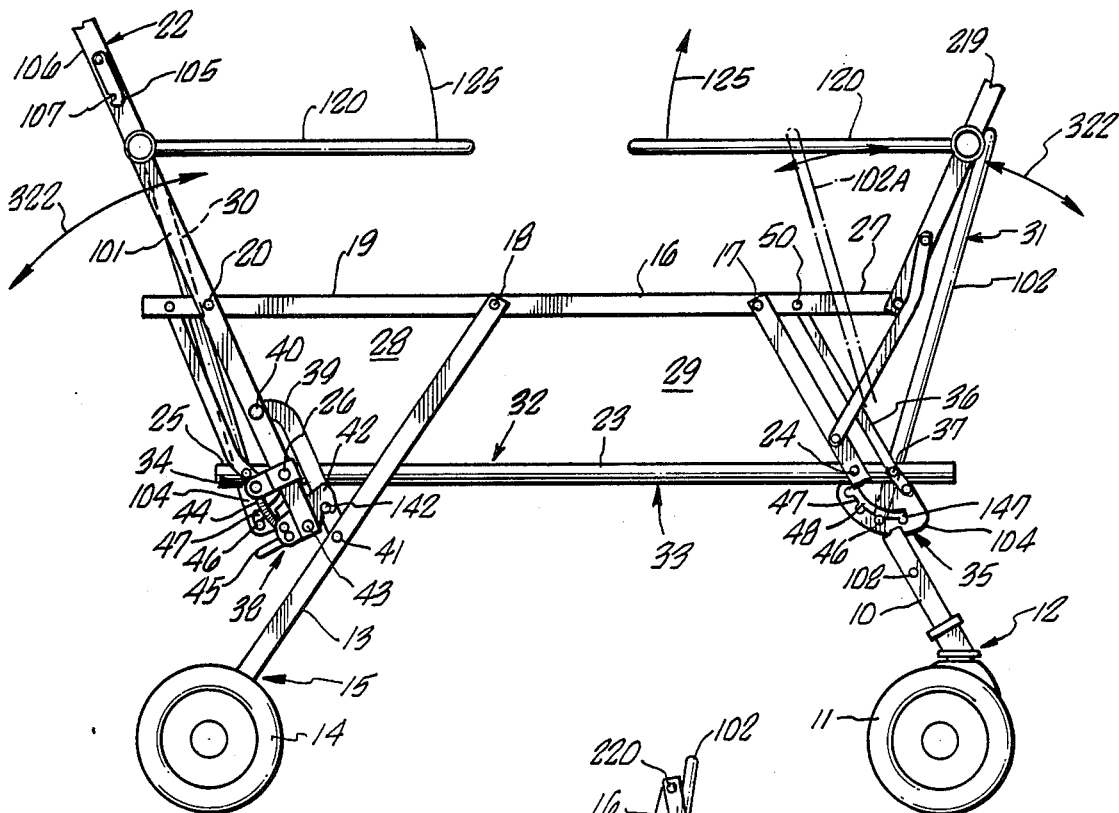
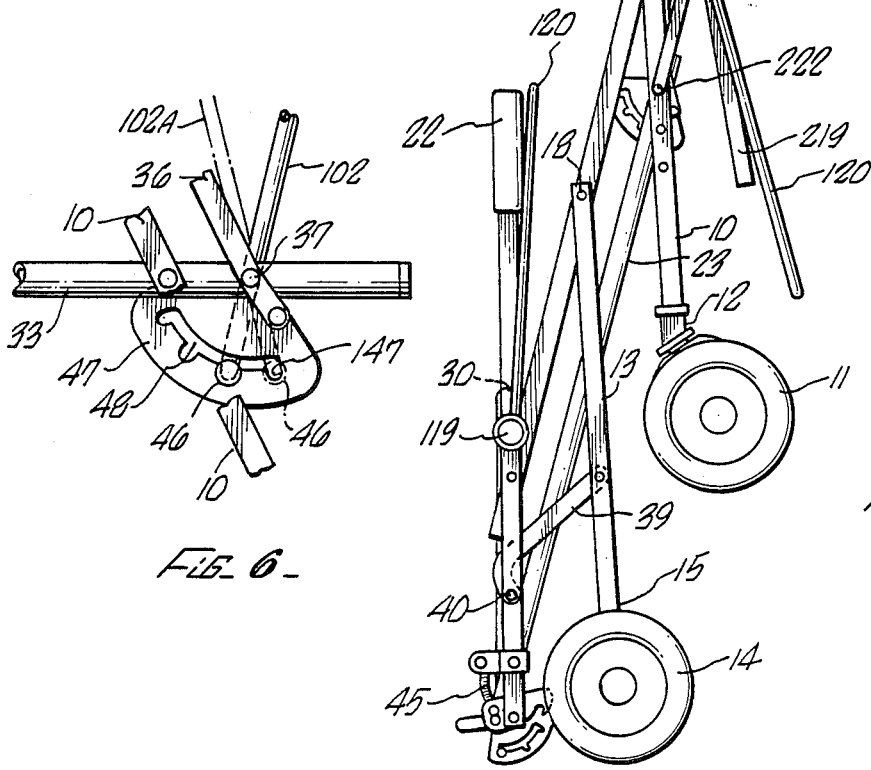
Fig. 1.
Fig. 6.
Fig. 2.

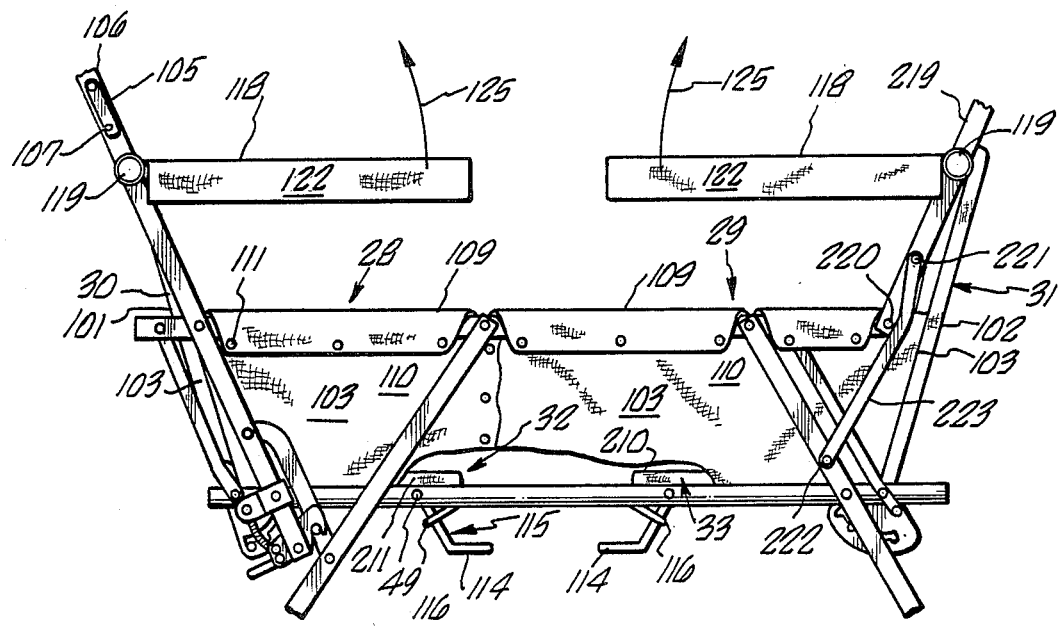
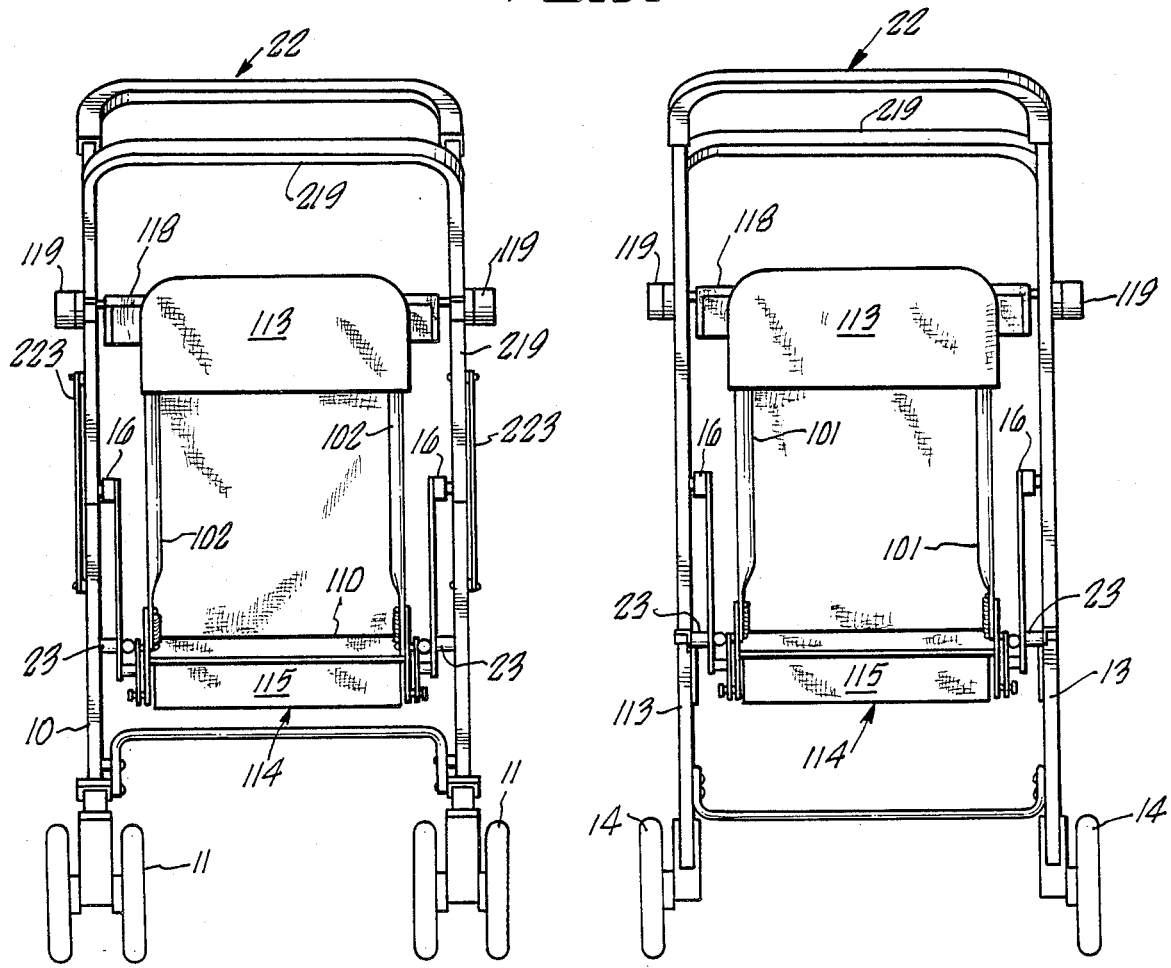
FIG. 3
FIG. 4
FIG. 5

TANDEM BABY CARRIAGE WITH FACING SEATS

RELATED APPLICATION

This Application is a continuation-in-part of application Ser. No. 113,260, filed Oct. 26, 1987, the contents of which are incorporated by reference herein.

BACKGROUND

This invention relates to a foldable tandem seat baby carriage wherein the seats face each other. In particular, the invention is concerned with a carriage having a construction for such a tandem seat arrangement which can be folded and unfolded with relative ease.

Many different styles and fabrications of baby carriage are available. Generally, baby carriages are made for single occupants and, therefore, have a single seat and backrest construction suitably mounted on legs relative to push handles. Different folding techniques are known to simplify the operation of the carriages.

It is also known to have tandem seat strollers and carriages; however, the construction and mechanism of such strollers to permit for ease of operation and folding is relatively cumbersome and complicated. It is not known to have a tandem seat stroller which is easily operable and which has maximum flexibility for an extended bed construction. Moreover, it is essential in providing such a stroller, which of necessity is larger than a single seat carriage or stroller, to have a construction which is relatively light and easy to operate both in the extended operative position and also in the closed, folded position where simplicity of handling is desirable. At the same time, such a carriage should be sufficiently sturdy and stable given the increased size of multiple occupants.

In tandem seat strollers it is also desirable for the person using the strollers to have ready access and sight of the occupants. This can be achieved by having the seating which is remote from the user face the handle, namely, by having a face-to-face stroller. Such a tandem stroller which is easy to operate, fold and unfold, is however unknown.

There is, accordingly, a need to provide a tandem seat baby carriage which is of sturdy construction, is easy to operate in the extended position, is easy to fold into the closed folded position, and permits for access and visibility to the occupants.

SUMMARY

The present invention provides a foldable two seat tandem seat baby carriage which overcomes the disadvantages of conventional baby carriages and which meets the needs of a tandem carriage.

A foldable two seat face-to-face tandem seat baby carriage comprises a pair of front legs having wheels mounted towards the lower ends, a pair of rear legs having wheels mounted towards the lower ends, a first pair of longitudinal parallel bars extending between each respective front leg and rear leg pivotally mounted towards the upper ends of the respective front legs and rear legs. There is also a second pair of longitudinal parallel bars extending between each respective front leg and rear leg, and which is pivotally mounted at a location between the top and the bottom of the respective front legs and which is substantially parallel with the first longitudinal bars.

Two tandem seats and backrests forming seatings extend transversely between the first pair of parallel bars, and face each other. The backrests are pivotally adjustable and collapsible relative to the seats about a transverse pivot located substantially in line with the second pair of longitudinal parallel bars.

For folding, the front backrest is angled rearwardly to be parallel with the rear backrest and adjustable locking elements with an additional locking slot permits this location. In the normal operative position the forward backrest is inclined forward so as to provide, in conjunction with the seat, a comfortable location for an occupant.

In an extended operative position, the first and second parallel bars are substantially horizontal. In a folded position, the legs fold towards each other and the parallel bars collapse and fold so that the backrests fold downwardly towards the respective seats between the collapsed parallel bars.

A transverse foot bar extending between the rear legs cooperates with an interengaging lock between the rear legs and the push handle to disengage the lock thereby to permit folding. On disengagement, under foot pressure, the downward pressure on the push handle causes a drawing-in action on the free ends of the front legs thereby to draw the parallel bars and legs into the folded position.

The above and other objects and advantages of the invention will be more readily apparent to those skilled in the art from the following detailed description in conjunction with the accompanying drawings which show one preferred embodiment of the invention.

DRAWINGS

FIG. 1 is a side elevational view of the unfolded baby carriage showing the legs and bars constituting the frame in the operative position with part of the front leg broken away to illustrate the adjustable locking element;

FIG. 2 is a side elevational view of the carriage showing the frame of the carriage in the collapsed folded position with part of the front leg broken away to illustrate the adjustable locking element;

FIG. 3 is a partial side elevational view of the carriage in the unfolded operative position illustrating the cover material located on the frame, and canopies over the seatings;

FIG. 4 is a front view of the carriage in the operative position;

FIG. 5 is a rear view of the carriage in the operative position.

FIG. 6 is an elongated view of the backrest frame of the forward seat showing the adjustable locking element.

DESCRIPTION

A foldable two seat face-to-face tandem baby carriage comprises a pair of front legs 10 having wheels 11 mounted towards the lower end 12 of each of the legs 10. A pair of rear legs 13 has wheels 14 mounted towards the lower end 15 of each of the rear legs 13. A first pair of longitudinal parallel bars 16 extends between each respective front leg 10 and rear leg 13 so as to be pivotally mounted with the front legs at 17 and with the rear legs at 18. A rearward extension 19 of the first parallel bars 16 extend to a pivotal mounting 20 with the limbs 21 of a U-shaped push handle 22.

Below the first longitudinal bars 16 are a second pair of longitudinal parallel bars 23 which are substantially parallel to the bars 16 and pivotally mounted at 24 at about mid-length along the front legs 10. The ends 25 of the bars 23 are pivotally mounted at 26 with the free ends of the limbs 21 of the U-shaped push handle 22. This is at a position remote from the front legs 10. The top longitudinal parallel bars 16 extend forwardly at 27 from the pivot 17.

Seating 28 and 29 is formed by a pair of tandem seats facing each other and illustrated in FIGS. 1 and 3. Two seats 32 and 33 extend between the first pair of parallel bars 16 with backrests members 30 and 31, respectively. The seats 32 and 33, respectively, are formed to lie substantially between the second pair of longitudinal bars 23. The backrests 30 and 31 are formed on frames 101 and 102 covered by a material 103. The material 103 links the seat 32 and 33 with the backrests 30 and 31. The backrests 30 and 31 have respective pivotal mounts 34 and 35 whereby the backrest 30 and 31 can be suitably adjusted and angulated relative to the seats 32 and 33 as desired.

An additional pair of support struts 36 are provided on each side of the carriage between a respective one of the upper parallel bars 16 and a respective one of the lower parallel bars 23. The support struts 36 are pivotally mounted at 50 with the upper parallel bar 16 and are pivotally mounted at 37 with the lower parallel bar 23.

In the extended operative position, the first and second parallel bars 16 and 23 are substantially horizontal. In a folded position, the legs 10 and 13 fold towards each other and the parallel bars 16 and 23 collapse and fold toward each other. The backrest frames 101 and 102 fold downwardly towards the respective seats 32 and 33 to be substantially between the collapsed parallel bars 16 and 23.

When the free ends of the U-shaped push handle 22 substantially abut the rear legs 13 at the mid-length of the rear legs, the carriage is in the operative position. A locking structure 38 includes a short limb 39 which is pivotally fixed at 40 to at least one of the free ends of the U-shaped push handle 22 and at 41 to a point midway along length of the rear leg 13. A hook limb 42 engages a or pin 142 extending transversely from the short limb 39. The hook limb 42 is pivotally mounted at 43 at the extreme free end of the push handle 22, and a spring 44 urges the 42 to remain in engagement with the protrusion 142.

A transverse bar 45 extending across the back of the carriage behind the rear legs 13 is operable under foot pressure against the spring 44 so as to release the hook limb 42 from the protrusion 142 and thereby unlock the 38 and carriage from its operative extended position. When this is done, a downward pressure on the push handle causes the push handle 22 to move downwardly and the front legs 10 to move rearwardly towards the rear legs 13 and the rear legs 13 to move relatively forwardly towards the front legs 10. Simultaneously, the backrests 30 and 31 of the seatings 28 and 29, respectively, move into a collapsed position forwardly to fold between the upper parallel bars 16 and the lower parallel bars 23. In the folded position, they close on the seats 32 and 33, respectively.

The bars 16 and 23 collapse about each other to be substantially parallel and closer together in the folded position. In this manner, the tandem seat carriage is easily operated under foot action and easy hand operation to close into the folded compact position.

Each of the backrests 30 and 31 includes substantially U-shaped frame members 101 and 102 which in the position for folding are parallel to the inverted U-shape of the push handle 22. The free ends of members 101 and 102 have protrusions 46 which engage in a slot 47 in an adjustable locking element being an angulated plate 104 mounted on the lower pair of parallel bars 23. The slot 47 is partly semicircular and contains cutout sections 48 into which the protrusion 46 can be located thereby to position the backrests 30 and 31, respectively, at the desired position of incline as indicated by arrows 322. When the position of incline of the backrests 30 and 31 ar substantially parallel to the push handle 22, folding is best effected to obtain the most compact collapsed and folded structure of the carriage.

In the operational position the forward backrest 31 is inclined forwardly as illustrated in FIG. 1. An extra slot position 147 is provided in the forward locking element plate 104 whereby the backrest frame member 102 can be locked into the position 102A parallel with the rear frame member 101 for permitting folding. The extra slot position 147 is well illustrated in FIG. 6. There is no need for the extra slot in the rear backseat, as can be seen in FIG. 2.

The support struts 36 have a pivot connection with the backrest frame 102 so that, on folding, as the struts 36 move towards the back legs 13 they cause the backrest 31 to move forwards and fold on the seat 33.

The appropriate stability for the carriage is obtained by having the front legs 10 extending slantingly relatively forward towards the wheels 11 and the rear legs 13 extending slantingly relatively backwards towards the wheels 14. The push handle 22 extends slantingly rearwardly when the carriage is in the operative position.

A catch 105 is mounted towards the top of the limb 106 of the inverted U-shaped push handle 22 is hingedly formed with a slot 107 in its free end to receive a protruding stud in pin 108 on the outside face of the forward leg 10 so that in the collapsed, folded position, the push handle 22 can hold the carriage together in its folded and collapsed position. Release of the protrusion 108 from the slot 107 in the free end of the catch 105 permits for release and extension of the carriage to its extended, unfolded position. By fully urging the carriage open, the limb 42 will engage the protrusion 142 and thereby lock the carriage in the open position.

A snapped on fabric material 109 is provided mounted over the top of the first and upper pair of parallel bars 16 to provide sides 110 to each of the tandem seatings 28 and 29 of the carriage. The snapped on material 109 has push button snaps 111 which interengage. A separate material length 210 constitutes the forward seat 29 in a separate material 211 constitutes the rear seat 28.

In certain desired operations, the forward seat fabric material 210 and/or rear seat material 211 can be removed from the frame 16 from its adjacent seat 28 or 29, as the case may be. The removal of the snapped on material 109 acts to remove not only the sidewalls 110 but also the seating portions 32 and 33 which are formed to be integral with the sidewalls 110 and the fabric material 113 which is formed to be integrally part of the backrest sections 103.

The backrests 30 and 31 are constituted by frame elements 101 and 102 which fit within pockets 113 in the rear of the backrest sections 103 of each of the seatings 28 and 29. In this manner, the material for each seat and backrest can be removed for cleaning. The backrests 30 and 31 can be moved to a substantially horizontal position to extend the carriage seats into a bed as required. With the backrest 30 inclined and the backrest 31 extended substantially horizontally and an effective bed is obtained for the carriage.

Each of the seatings 28 and 29 has a foot rest structure 114 pivotally mounted between the lower parallel bars 23 on a transverse bar 49. Each footrest 114 includes a frame structure over which a fabric material 115 is located and removably snapped into position. A second transverse bar 116 is mounted pivotally from and below the parallel bars 23 for movement to interengage the frame 114 so that the footrest structure 114 can be located at different reclining positions. In this fashion, the two footrests 114 are independent of the seatings 28 and 29 while being located appropriately below the seat sections 32 and 33 to be effective rests for the feet of babies and children in the carriage.

Also provided for the carriage are removable and foldable canopies 118 which ar affixed to the carriage framework by means of transverse pivot hinges 119 near the top of the push handle 22 and a forward U-shaped bar 219 which is mounted on hinges 220 with bar 16. The U-shaped bar 219 is also anchored with a strut 223 connected through pivot connectors 221. The strut 223 is pivotally connected at 222 to the front legs 10. As the carriage folds, so the bar 219 is extended downwardly toward the front legs 10 to permit for neat folding of the carriage as indicated in FIG. 2.

The U-shaped transverse extension bars 120 are hingedly mounted at 119. The bars 120 can extend over the parallel bars 16 thereby to extend the fabric material 122 of the canopy 118 over the carriage. The canopies 118 can be folded backwards as indicated by the arrows 125 in a position to abut the push handle 22 and forward bar 219. The canopies 118 protect the respective rear seating 28 and the front seating 29.

The wheels 11 and 14 have appropriate shock-absorbing characteristics in their mountings and can have brake elements provided to prevent undesired rotation of the wheels.

The structure provides a foldable baby carriage which is convenient for the user, since the two tandem seatings 28 and 29 face each other. The carriage is sufficiently sturdy by virtue of the two sets of parallel bars 16 and 23, which extend laterally and horizontally forward in use to provide sufficient rigidity to the structure. Similarly, the interaction of the legs, parallel bars, and push handle is of a nature that when unlocked, folding is easily effected by downward action on the push handle which causes a collapsed and folding retraction of the legs 10 and 13 towards each other with the parallel bars 16 and 23 closing together. In the folded position, there is a balance achieved between the floor engaging section of the wheels 14 and the lock arrangement 38 so as to provide an upright balance to the carriage.

While only one embodiment of the invention has been shown and described in detail, it will be understood that this is for illustration purposes, and the scope of the invention is to be determined according to the appended claims.

What is claimed:

1. A foldable face-to-face tandem baby carriage comprising a pair of front legs having wheels mounted at the lower ends, a pair of rear legs having wheels mounted at the lower ends, a first pair of parallel bars extending between each respective front leg and rear leg and pivotally mounted near the upper ends of the respective front leg and rear leg, a second pair of lower parallel bars extending between each respective front leg and rear leg and pivotally mounted between the top and the bottom of the front leg, the second pair of parallel bars being substantially parallel with the first pair of bars, a substantially U-shaped push handle, said push handle having free ends, said free ends of the handle being pivotally connected near the ends of the second pair of bars remote from the front legs, a lock between the rear legs and the push handle, a transverse foot bar pivotally extending between the rear legs and operable for disengaging the lock to thereby permit folding of said carriage a tandem pair of seats and backrests pivotally extending between the pairs of bars and forming said face to face seating, the backrests being pivotally collapsible relative to the seats about a transverse pivot, such that in an extended operational position the first and second parallel bars are substantially horizontal, and in a folded position the legs fold towards each other, the first and second pairs of parallel bars fold together, and the backrests fold downwardly towards the respective seats between the folded parallel bars, and wherein the seating of the tandem pair of seats and backrests face each other in the operational position.

2. A carriage as claimed in claim 1 wherein the tandem seat at the rear includes a backrest inclined rearwardly in the operational position and the tandem seat at the front includes a backrest inclined forwardly in the operational position, and wherein the front backrest is inclined rearwardly and parallel to the rear backrest in a non-operational position to permit folding.

3. A carriage as claimed in claim 1 including at least a pair of struts, with each said strut extending between a respective bar of the front pair of parallel bars and the respective bar of the second pair of parallel bars, the struts being pivotally mounted relative to the parallel bars wherein in the extended operative position the struts are forwardly extended and in the folded position the struts are adjacent the rear legs, the struts being located near the front legs.

4. A carriage as claimed in claim 3 wherein the struts have a pivot connection with at least one of the backrests so as to cooperate with and cause the backrest to fold downwardly when in the folded position.

5. A carriage as claimed in claim 4 wherein the struts cooperate in the same manner with the forwardly located backrest.

6. A carriage as claimed in claim 3 wherein the backrests include pivotal mountings between the respective bars of the lower parallel bars, the pivotal mounting including an adjustable locking element for permitting the adjustment of the backrest inclination, and wherein the locking element for the forward backrest permits the backrest to be locked parallel with the rear backrest.

7. A carriage as claimed in claim 1 wherein the transverse bar is operative under foot pressure to disengage the lock and wherein downward pressure on the push handle and drawing-in action on the wheel ends of the front legs acts to draw the parallel bars and legs into the folded position.

8. A carriage as claimed in claim 7 including a catch, said catch having a slot in its free end, said free end capable of receiving a protruding stud on the outside face of the forward leg so as to hold the push handle together with at least one of the front legs in the folded position.

9. A carriage as claimed in claim 8 including snapped-on material mounted on the first pair of parallel bars to provide sidewalls for the seats.

10. The carriage as claimed in claim 6 wherein the backrests are pivotally collapsible forwardly and rearwardly relative to the seats.

11. A carriage as claimed in 1 including footrests mounted ahead of and below the seats, the footrests being mounted transversely between the second pair of parallel bars.

12. A carriage as claimed in claim 1 including foldable canopies hingedly mounted so as to extend selectively over the respective seats.

13. A carriage as claimed in claim 1 including a foldable canopy removably mounted for extending over the rear seat and a foldable canopy removably mounted on a frame posterior to the front seat for extending over the front seat.

14. A foldable face-to-face tandem baby carriage comprising a pair of front legs having wheels mounted at the lower ends, a pair of rear legs having wheels mounted at the lower ends, a first pair of longitudinal parallel bars extending between each respective front leg and rear leg and pivotally mounted near the upper ends of the respective front leg and rear leg, a second pair of longitudinal parallel bars extending between each respective front leg and rear leg and pivotally mounted between the top and the bottom of the front leg, the second pair of parallel bars being substantially parallel with the first pair of longitudinal bars, a substantially U-shaped push handle, the free ends of the handle being pivotally connected near the ends of the second pair of longitudinal bars remote from the front legs, a lock between the rear legs and the push handle, a transverse foot bar pivotally extending between the rear legs and operable for disengaging the lock to thereby permit folding of said carriage, the lock including a short limb pivotally connected between the free end of the push handle and the rear legs, the limb having a pin for cooperation with a slotted hook limb attached to the transverse bar, a tandem seating pair having seats and backrests pivotally extending between the first pair of bars from the front to the back, the backrests being connected to the second pair of longitudinal parallel bars so as to be pivotally adjustable and collapsible relative to the seats about a transverse pivot, the transverse pivot being located on the second pair of longitudinal parallel bars, such that in an extended operational position the first and second parallel bars are substantially horizontal and in a folded position, the legs fold towards each other, the first and second pairs of parallel bars collapse together, and the backrests fold downwardly towards the respective seats between the collapsed parallel bars, and wherein the seats and backrests of the tandem seating pair face each other in the operational position.

15. A carriage as claimed in claim 14 including snapped-on material mounted on the first parallel bars to provide sidewalls for the carriage, the snapped-on material forming part of seats and backrests for each seat and being adapted to snap together to be selectively separable.

16. A carriage as claimed in claim 15 wherein the seats and backrests include frames with removable material on the frames.

17. A carriage as claimed in claim 16 wherein at least a pair of support struts extend respectively between the pivot mounting of the top of each rear leg with the first pair of longitudinal bars and the respective bar of the second pair of parallel bars, the struts being pivotally mounted relative to the second parallel bars and being pivotally mounted about the first parallel bar, such that in the extended operative position the struts are forwardly extended and are substantially parallel with the front legs, and in the folded position the struts are adjacent the rear legs, and the struts are located near the front legs.

18. A foldable tandem baby carriage comprising a pair of front legs having wheels mounted at the lower ends, a pair of rear legs having wheels mounted at the lower ends, a first pair of longitudinal parallel bars extending between each respective front leg and rear leg and pivotally mounted near the upper ends of the respective front leg and rear leg, a second pair of longitudinal parallel bars extending between each respective front leg and rear leg and pivotally mounted between the top and the bottom of the front leg, the second pair of parallel bars being substantially parallel with the first pair of longitudinal bars, a substantially U-shaped push handle, said push handle having free ends, said free ends of the handle being pivotally connected with the ends of the second pair of longitudinal bars remote from the front legs, tandem seating having a pair of tandem seats and backrests pivotally extending between the first pair of bars from the front to the back, the backrests connected to the second pair of longitudinal parallel bars so as to be pivotally adjustable and collapsible relative to the seats about a transverse pivot, the transverse pivot being located on the second pair of longitudinal parallel bars, such that in an extended operational position the first and second parallel bars are substantially horizontal and in a folded position, the legs fold towards each other, the first and second pair of parallel bars collapse together, and the backrests fold downwardly towards the respective seats between the collapsed parallel bars, support struts extending respectively between the pivot mounting of the top of each rear leg with the first pair of longitudinal bars and the respective bar of the second pair of parallel bars, the struts being pivotally mounted relative to the second parallel bars, and being pivotally mounted about the first parallel bar wherein in the extended operative position the struts are forwardly extended and are substantially parallel with the front legs, and in the folded position the struts are adjacent the rear legs, and a lock between the rear legs and the push handle, a transverse foot bar pivotally extending between the rear legs and operable for disengaging the lock to thereby permit folding of said carriage upon downward pressure on the push handle and raising of the parallel bars towards the push handle, and wherein the seating of the tandem pair face each other in the operational position.

* * * * *